(12) United States Patent
Wang et al.

(10) Patent No.: US 12,546,929 B2
(45) Date of Patent: Feb. 10, 2026

(54) OPTICAL WAVEGUIDE STRUCTURE AND DISPLAY DEVICE

(71) Applicant: BOE TECHNOLOGY GROUP CO., LTD., Beijing (CN)

(72) Inventors: Wei Wang, Beijing (CN); Xianqin Meng, Beijing (CN); Qiuyu Ling, Beijing (CN); Pengxia Liang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 339 days.

(21) Appl. No.: 18/024,319

(22) PCT Filed: Feb. 15, 2022

(86) PCT No.: PCT/CN2022/076381
§ 371 (c)(1),
(2) Date: Mar. 2, 2023

(87) PCT Pub. No.: WO2023/155051
PCT Pub. Date: Aug. 24, 2023

(65) Prior Publication Data
US 2024/0310565 A1    Sep. 19, 2024

(51) Int. Cl.
*F21V 8/00* (2006.01)
*G02B 5/30* (2006.01)

(52) U.S. Cl.
CPC ......... *G02B 6/0016* (2013.01); *G02B 5/3058* (2013.01); *G02B 6/0036* (2013.01); *G02B 6/0056* (2013.01)

(58) Field of Classification Search
CPC ... G02B 6/0016; G02B 6/0036; G02B 6/0056
See application file for complete search history.

(56) References Cited

U.S. PATENT DOCUMENTS 10,088,675 B1    10/2018    Brown et al.
10,571,699 B1*   2/2020    Parsons ................ G02B 6/0028
(Continued)

FOREIGN PATENT DOCUMENTS

CN    111240015 A    6/2020
CN    111492273 A    8/2020
(Continued)

*Primary Examiner* — Jennifer D. Carruth
(74) *Attorney, Agent, or Firm* — WHDA, LLP (57) ABSTRACT

The present disclosure provides an optical waveguide structure, including: at least two layers of optical waveguides; a coupling-in grating configured to allow received parallel light beams to enter the optical waveguides, the parallel light beams being propagated in the optical waveguides in a total-reflection manner at a first propagation step; a beam splitting structure configured to allow a first part of light beams to be reflected in such a manner that the first part of light beams are propagated at a second propagation step, and allow a second part of light beams to be transmitted in such a manner that the second part of light beams are propagated at the first propagation step, the second propagation step being different from the first propagation step; and a coupling-out grating configured to extract the light beams propagated in total-reflection manner in the at least two layers of optical waveguides.

14 Claims, 5 Drawing Sheets

(56) References Cited

U.S. PATENT DOCUMENTS

| | | | | |
|---|---|---|---|---|
| 2012/0062998 A1* | 3/2012 | Schultz | | G02B 27/0101 |
| | | | | 156/60 |
| 2018/0188542 A1* | 7/2018 | Waldern | | G02B 27/0093 |
| 2020/0089014 A1* | 3/2020 | Peng | | G02B 27/1086 |
| 2020/0333614 A1 | 10/2020 | Blomstedt | | |
| 2020/0341194 A1 | 10/2020 | Waldern et al. | | |
| 2020/0363578 A1* | 11/2020 | Choi | | G02B 6/0066 |

FOREIGN PATENT DOCUMENTS

| | | | |
|---|---|---|---|
| CN | 111722317 | A | 9/2020 |
| CN | 211826603 | U | 10/2020 |

* cited by examiner

OPTICAL WAVEGUIDE STRUCTURE AND DISPLAY DEVICE

CROSS-REFERENCE TO RELATED APPLICATION

This application is the U.S. national phase of PCT Application No. PCT/CN2022/076381 filed on Feb. 15, 2022, which is incorporated herein by reference in its entirety.

TECHNICAL FIELD

The present disclosure relates to the field of display technology, in particular to an optical waveguide structure and a display device.

BACKGROUND

In a conventional Augmented Reality (AR) diffractive waveguide design, usually the uniformity of a coupled image is improved through changing a groove shape, a groove depth and a refractive index of a grating on a waveguide surface. In this mode, the precision and complexity of micro/nano processing is highly demanded. Due to the limit of the processing complexity, it is impossible to completely improve t the image uniformity.

SUMMARY

An object of the present disclosure is to provide an optical waveguide structure and a display device, so as to improve the process when the uniformity of the coupled image is improved through changing parameters of the grating.

In one aspect, the present disclosure provides in some embodiments an optical waveguide structure, including: at least two layers of optical waveguides laminated one on another and having a same refractive index, the optical waveguides including a bottom-layer optical waveguide and a top-layer optical waveguide in a lamination direction, the bottom-layer optical waveguide including a first surface away from the top-layer optical waveguide, the top-layer optical waveguide including a second surface away from the bottom-layer optical waveguide; a coupling-in grating provided on the first surface or the second surface and configured to allow received parallel light beams to enter the optical waveguides, the parallel light beams being propagated in the optical waveguides in a total-reflection manner at a first propagation step; a beam splitting structure arranged between two adjacent layers of the optical waveguides, and configured to allow a first part of light beams in the light beams propagated in a corresponding optical waveguide to be reflected in such a manner that the first part of light beams are propagated at a second propagation step, and allow a second part of light beams in the light beams propagated in a corresponding optical waveguide to be transmitted in such a manner that the second part of light beams are propagated at the first propagation step, the second propagation step being different from the first propagation step; and a coupling-out grating arranged on the first surface or the second surface and configured to extract the light beams propagated in total-reflection manner in the at least two layers of optical waveguides.

In a possible embodiment of the present disclosure, a width of the beam splitting structure in a propagation direction of the light beam in the optical waveguide is larger than a width of the light beam in the optical waveguide.

In a possible embodiment of the present disclosure, an orthogonal projection of the beam splitting structure onto the first surface is located within a first region of the first surface such that light beams from the beam splitting structure are directly transmitted toward the coupling-out grating.

In a possible embodiment of the present disclosure, the beam splitting structure includes at least two light splitting members arranged sequentially in a propagation direction of the light beams within the optical waveguides, and for the at least two light splitting members, ratios of intensity of the first part of light beams to intensity of the second part of light beams are different.

In a possible embodiment of the present disclosure, the beam splitting structure includes at least two light splitting members arranged sequentially in a propagation direction of the light beams within the optical waveguides, and for the at least two light splitting members, ratios of intensity of the first part of light beams to intensity of the second part of light beams gradually increase or gradually decrease in a propagation direction of the light beams within the optical waveguides.

In a possible embodiment of the present disclosure, the optical waveguide structure further includes an intermediate grating arranged on the first surface or the second surface, and an orthogonal projection of the intermediate grating onto the first surface is located between an orthogonal projection of the coupling-in grating onto the first surface and an orthogonal projection of the coupling-out grating onto the first surface. The beam splitting structure includes a first beam splitting sub-structure and a second beam splitting sub-structure, the first beam splitting sub-structure is configured to allow a third part of light beams in the light beams propagated in a corresponding optical waveguide to be reflected in such a manner that the third part of light beams is propagated toward the intermediate grating at a third propagation step, and allow a fourth part of light beams in the light beams propagated in a corresponding optical waveguide to be transmitted in such a manner that the fourth part of light beams is propagated toward the intermediate grating at the first propagation step, the second sub-splitting structure is configured to allow a fifth part of light beams in the light beams propagated in a corresponding optical waveguide to be reflected in such a manner that the fifth part of light beams is propagated toward the coupling-out grating at a fourth propagation step, and allow a sixth part of light beams in the light beams propagated in a corresponding optical waveguide to be transmitted in such a manner that the sixth part of light beams is propagated toward the coupling-out grating at a fifth propagation step, the third propagation step is different from the first propagation step, the fourth propagation step is different from the first propagation step, the third propagation step is different from the fourth propagation step, and the fifth propagation step is the same as, or different from, the first propagation step.

In a possible embodiment of the present disclosure, the beam splitting structure includes at least two first light splitting members arranged sequentially in a propagation direction of the light beams toward the intermediate grating, and at least two second light splitting members arranged sequentially in a propagation direction of the light beams toward the coupling-out grating, ratios of intensity of the third part of light beams to intensity of the fourth part of light beams are different for the at least two first beam splitting members, and ratios of intensity of the fifth part of light beams to intensity of the sixth part of light beams are different for the at least two second beam splitting members.

In a possible embodiment of the present disclosure, the beam splitting structure includes at least two third light splitting members arranged in a propagation direction of the light beams from the intermediate grating to the coupling-out grating, and for the at least two third light splitting members, ratios of intensity of the reflected light beams to intensity of the transmitted light beams gradually increase or gradually decrease in the propagation direction of the light beams from the intermediate grating to the coupling-out grating.

In a possible embodiment of the present disclosure, the beam splitting structure is a polarization beam splitter consisting of metal wire grids.

In a possible embodiment of the present disclosure, the beam splitting structure includes a plurality of dielectric or metallic film layers having different refractive indices.

In another aspect, the present disclosure provides in some embodiments a display device including the above-mentioned optical waveguide structure.

The present disclosure has the following beneficial effects. Through the beam splitting structure between the adjacent optical waveguides, it is able to improve the uniformity of the AR diffraction waveguide with a simple process. In addition, it is able to directly prevent, to a great extent, the uniformity of the coupled image from being adversely affected due to a difference in the propagation steps of the light beams in different fields of view, and improve the design freedom. As a result, it is able to remarkably reduce the complexity in the design of the gratings on a surface of the waveguide, thereby to improve the yield while ensuring the uniformity of the coupled image.

BRIEF DESCRIPTION OF THE DRAWINGS

FIG. 6b is a schematic view showing the arrangement of a beam splitting structure corresponding to the gratings in FIG. 6a;

FIG. 6c is another schematic view showing the arrangement of the beam splitting structure corresponding to the gratings in FIG. 6a;

FIG. 7b is a schematic view showing the arrangement of the beam splitting structure corresponding to the gratings in FIG. 7a:

FIG. 7c is another schematic view showing the arrangement of the beam splitting structure corresponding to the gratings in FIG. 7a:

FIG. 8b is a schematic view showing the arrangement of the beam splitting structure corresponding to the gratings in FIG. 8a;

FIG. 8c is another schematic view showing the arrangement of the beam splitting structure corresponding to the gratings in FIG. 8a.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

In the embodiments of the present disclosure, it should be appreciated that, such words as "in the middle of", "on/above", "under/below", "left", "right", "vertical", "horizontal", "inside" and "outside" may be used to indicate directions or positions as viewed in the drawings, and they are merely used to facilitate the description in the present disclosure, rather than to indicate or imply that a device or member must be arranged or operated at a specific position. In addition, such words as "first", "second" and "third" may be merely used to differentiate different components rather than to indicate or imply any importance.

Figure 1:
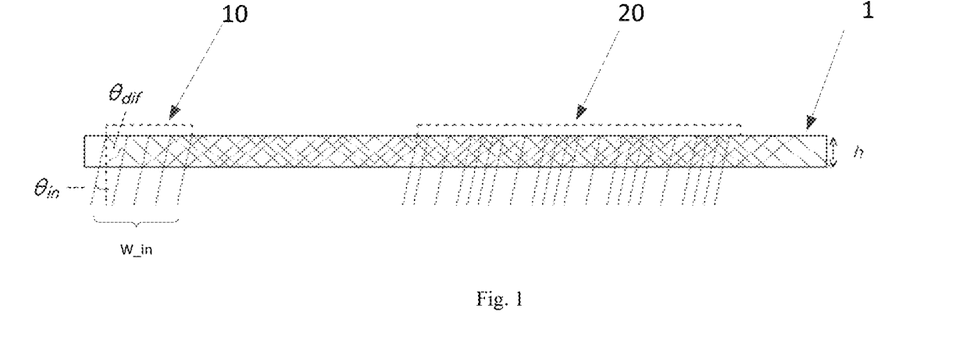
FIG. 1 is a schematic view showing a situation where a propagation step is smaller than a beam width in the related art.
Figure 3:
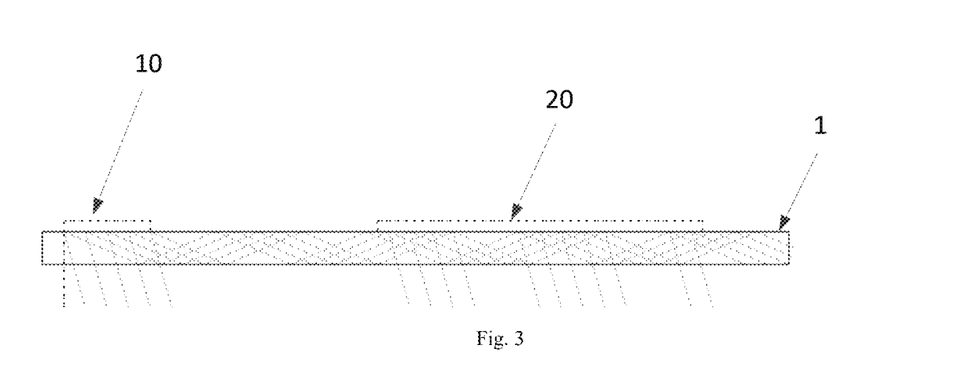
FIG. 3 is a schematic view showing a situation where the propagation step is greater than the beam width in the related art.
Figure 4:
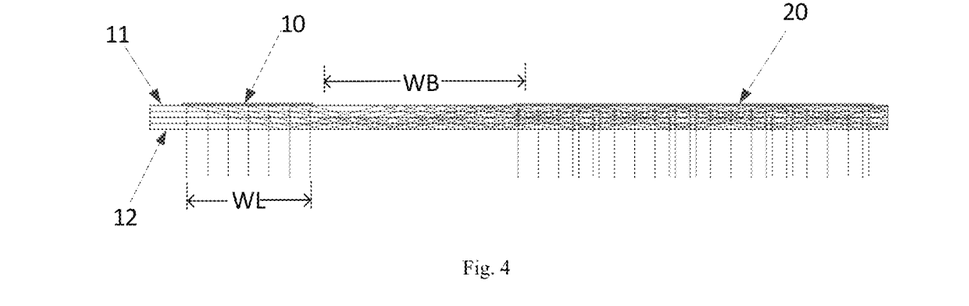
FIG. 4 is a schematic view showing an optical path of an optical waveguide structure according to one embodiment of the present disclosure.

In a conventional AR waveguide design, light beams from an optical waveguide are distributed unevenly at some viewing angles due to a difference between a propagation step and a beam width. In a situation as shown in FIG. 1 (where the propagation step is smaller than the beam width), a region where a coupling-out grating 20 is located is divided into sub-regions, and compensation is performed through changing the coupling efficiency of a grating. However, in a situation as shown in FIG. 3, when a distance between the light beams is too large (e.g., greater than a diameter of a pupil), it is impossible to perform the compensation through changing the coupling efficiency. At this time, usually a period of coupling-in gratings is adjusted to change a transmission angle of the light beam in the waveguide, or the optical waveguide 1 is thinned to reduce the propagation step, so as to prevent the uneven distribution of the light beams. However, in this mode, the uniformity of the light beams is improved at the cost of a dead-zone-free transmission width supported by the optical waveguide 1, and meanwhile the diffraction may occur for the light beams for the second time at a region where a coupling-in gating 10 is located, so the luminous efficiency is reduced, or the design of the coupling-in grating 10 is highly demanded (the light beams efficiently enter the waveguide from air, but they reach the coupling-in grating for the second time in the optical waveguide 1, so the luminous efficiency is very low due to the diffraction for the second time).

For a light beam at a transmission angle of $\theta_{dif}$, a propagation step is step=2+h+tan($\theta_{dif}$), where h is a thickness of the optical waveguide, and w_in is a beam width (typically an aperture size of the coupling-in grating 10).

When step <w_in, the light beams with different transmission times may overlap with each other. With reference to FIG. 1, the overlapping light beams may be extracted multiple times at the coupling-out grating. At this time, the coupling-out grating may be divided into several regions to improve the uniformity of a coupled image. However, the diffraction may occur for the second time at the coupling-in grating, so the luminous efficiency is reduced.

Figure 2:
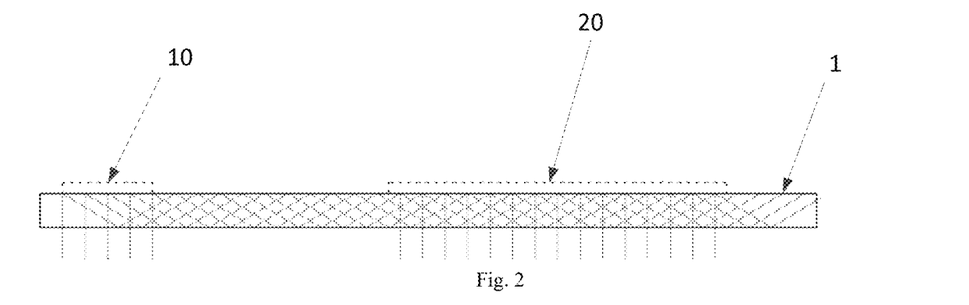
FIG. 2 is a schematic view showing a situation where the propagation step is equal to the beam width in the related art.

When step=w_in, the light beams with different transmission times may be arranged immediately adjacent to each other, and may be uniformly extracted at the coupling-out grating (it is necessary to divide the coupling-out grating into regions, so as to compensate for an intensity loss caused by multiple extractions, as shown in FIG. 2).

When step >w_in, a gap may exist between the light beams with different transmission times, and with reference to FIG. 3, the light beams may be intermittently extracted at the coupling-out grating (when the gap between the light beams is too large (for example, greater than the diameter of the pupil), it is impossible to perform the compensation through changing the coupling efficiency of the grating). At this time, no diffraction of light beams occurs for the second time in the region where the coupling-in grating is located, so the luminously efficiency is not reduced.

As shown in FIGS. 4 to 9, in order to solve the above problems, the present disclosure provides in some embodiments an optical waveguide structure, which includes: at least two layers of optical waveguides 1 laminated one on another and having a same refractive index, the optical waveguides 1 including a bottom-layer optical waveguide 1 and a top-layer optical waveguide 1 in a lamination direction, the bottom-layer optical waveguide 1 including a first surface away from the top-layer optical waveguide 1, the top-layer optical waveguide 1 including a second surface away from the bottom-layer optical waveguide 1; a coupling-in grating 10 provided on the first surface or the second surface and configured to allow received parallel light beams to enter the optical waveguides 1, the parallel light beams being propagated in the optical waveguides 1 in a total-reflection manner at a first propagation step; a beam splitting structure 100 arranged between two adjacent layers of the optical waveguides 1, and configured to allow a first part of light beams in the light beams propagated in a corresponding optical waveguide 1 to be reflected in such a manner that the first part of light beams are propagated at a second propagation step, and allow a second part of light beams in the light beams propagated in a corresponding optical waveguide 1 to be transmitted in such a manner that the second part of light beams are propagated at the first propagation step, the second propagation step being different from the first propagation step; and a coupling-out grating 20 arranged on the first surface or the second surface and configured to extract the light beams propagated in total-reflection manner in the at least two layers of optical waveguides 1.

Through adding the beam splitting structure 100 between the adjacent optical waveguides 1, it is able to improve the uniformity of the AR diffraction waveguide with a simple process. In addition, the propagation step of the light beam is reduced, so it is able to meet the requirement on the uniformity, enlarge a field angle, directly prevent, to a great extent, the uniformity of the coupled image from being adversely affected due to a difference in the propagation steps of the light beams in different fields of view, and improve the design freedom. As a result, it is able to remarkably reduce the complexity in the design of the gratings on a surface of the waveguide, thereby to improve the yield while ensuring the uniformity of the coupled image.

It should be appreciated that, in the embodiments of the present disclosure, as compared with a conventional single-layer optical waveguide 1, a thickness of the optical waveguide 1 in each layer is smaller than that of the single-layer optical waveguide 1. The at least two layers of optical waveguides 1 in the embodiments of the present disclosure are obtained through dividing the conventional single-layer optical waveguide 1, and then the beam splitting structure 100 is arranged between the adjacent optical waveguides 1 (the single-layer optical waveguide is divided into at least two layers of optical waveguides 1 to reduce the thickness of each layer of optical waveguide, so as to reduce the propagation step of the reflected light beam, but the propagation step of the light beam transmitted in all the optical waveguides remains unchanged). In this way, it is able to reduce the propagation step of the light beam transmitted to the coupling-out grating 20, thereby to prevent the uniformity of the coupled image from being adversely affected due to a difference in the propagation steps of the light beams in different fields of view.

It should be further appreciated that, the thicknesses of at least two layers of optical waveguides 1 may be the same or different. The quantity of at least two optical waveguides 1 may be set according to the practical need. For example, the at least two optical waveguides 1 include, but not limited to, two layers of optical waveguides 1.

It should be further appreciated that, in the embodiments of the present disclosure, the propagation step is larger than the beam width of the light beam coupled into the optical waveguide 1.

For example, a width WB of the beam splitting structure 100 in a propagation direction of the light beam in the optical waveguide 1 is larger than a width WL of the light beam in the optical waveguide 1.

Based on the above, it is able to split all the light beams entering the optical waveguides 1 through the coupling-in grating 10.

Figure 5:
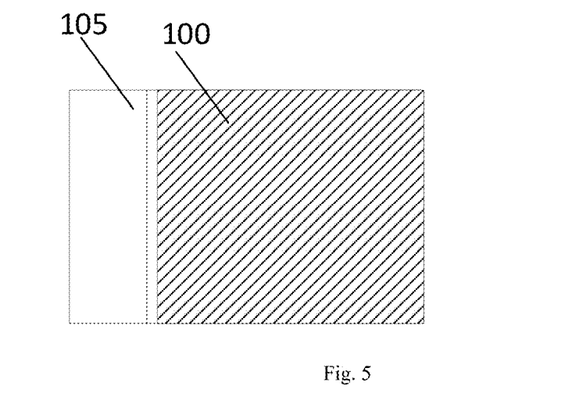
FIG. 5 is a schematic view showing the arrangement of a beam splitting structure according to one embodiment of the present disclosure.

Illustratively, as shown in FIG. 5, an orthogonal projection of the beam splitting structure 100 onto the first surface is located within a first region outside an orthogonal projection 105 of the coupling-in grating 10 onto the first surface, and there is a gap between the first region and the orthogonal projection 105 of the coupling-in grating 10 onto the first surface, so as to prevent the light beams entering the region where the coupling-in grating 10 is located from being shielded by the beam splitting structure 100.

Illustratively, the orthogonal projection of the beam splitting structure 100 onto the first surface is located within the first region of the first surface such that the light beams from the beam splitting structure 100 are directly transmitted toward the coupling-out grating 20. An orthogonal projection of the first region onto the first surface is located between the orthogonal projection 105 of the coupling-in grating 10 onto the first surface and an orthogonal projection 106 of the coupling-out grating 20 onto the first surface. The first region is arranged to, but not limited to, partially overlap the orthogonal projection 106 of the coupling-out grating 20 onto the first surface, as long as the light beam from the beam splitting structure 100 directly enters the coupling-out grating 20. In this way, it is able to reduce the cost.

It should be appreciated that, the arrangement of the beam splitting structure 100 is not limited to that mentioned hereinabove. For example, in some embodiments of the present disclosure, the orthogonal projection of the first region onto the first surface is located between the orthogonal projection 105 of the coupling-in grating 10 onto the first surface and the orthogonal projection 106 of the coupling-out grating 20 onto the first surface, and light beams from the beam splitting structure 100 may be propagated in the optical waveguide 1 for a certain distance and then reach the coupling-out grating 20.

Figure 6A:
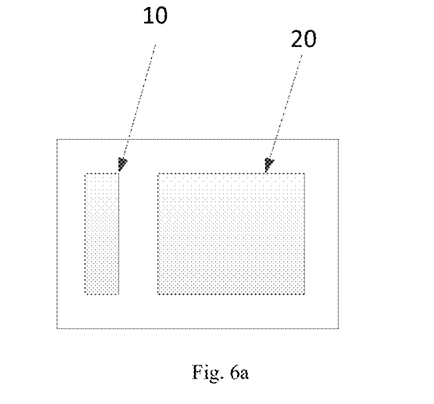
FIG. 6a is a schematic view showing the arrangement of a coupling-in grating and a coupling-out grating according to one embodiment of the present disclosure.
Figure 6B:
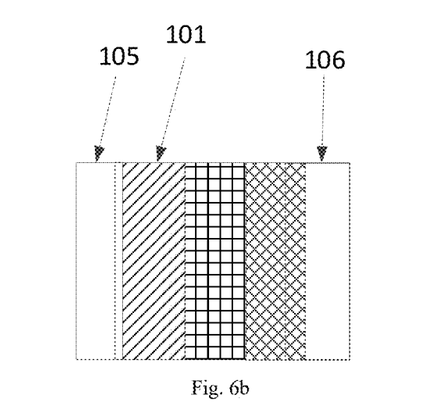
Figure 8A:
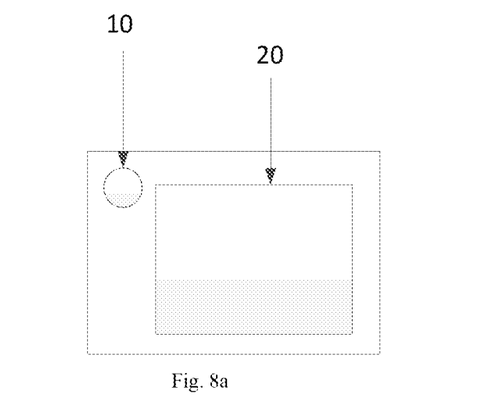
FIG. 8a is yet another schematic view showing the arrangement of the coupling-in grating and the coupling-out grating according to one embodiment of the present disclosure.
Figure 8B:
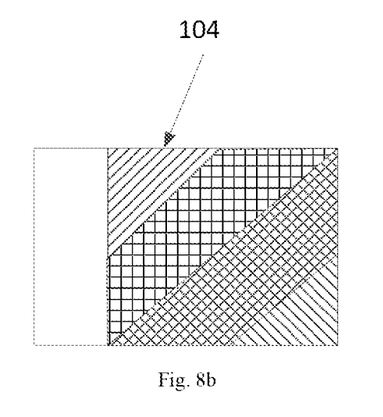

Illustratively, the beam splitting structure 100 includes at least two light splitting members 101 arranged sequentially in a propagation direction of the light beams within the optical waveguides 1, and for the at least two light splitting members 101, ratios of intensity of the first part of light beams to intensity of the second part of light beams are different (as shown in FIGS. 6b and 8b, the at least two light splitting members 101 are filled with different patterns to indicate different ratios).

Through the arrangement of the at least two light-splitting members 101, it is able to split the light beams from the coupling-in grating 10 for multiple times, and change the propagation step of the light beams for multiple times, thereby to prevent the uniformity of the coupled image from being adversely affected due to a difference in the propagation steps of the light beams in different fields of view.

Figure 6C:
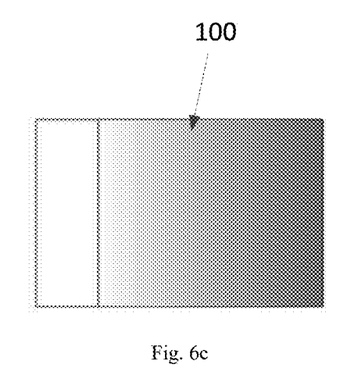
Figure 8C:
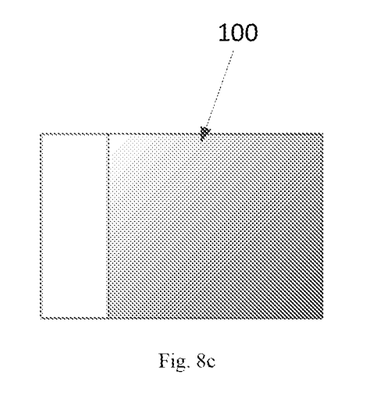

Illustratively, the beam splitting structure 100 includes at least two light splitting members 101 arranged sequentially in the propagation direction of the light beams within the optical waveguides 1, and for the at least two light splitting members 101, ratios of intensity of the first part of light beams to intensity of the second part of light beams gradually increase or gradually decrease in the propagation direction of the light beams within the optical waveguides 1, as shown in FIGS. 6c and 8c. In FIG. 6c, the change in the ratios is set in accordance with the arrangement of the coupling-in grating 10 and the coupling-out grating 20 in FIG. 6a, i.e., the propagation direction of the light beams to the coupling-out grating 20. In FIG. 8c, the change in the ratios is set in accordance with the arrangement of the coupling-in grating 10 and the coupling-out grating in FIG. 8a.

Based on the above, it is able to improve the image uniformity in a better manner.

Figure 7A:
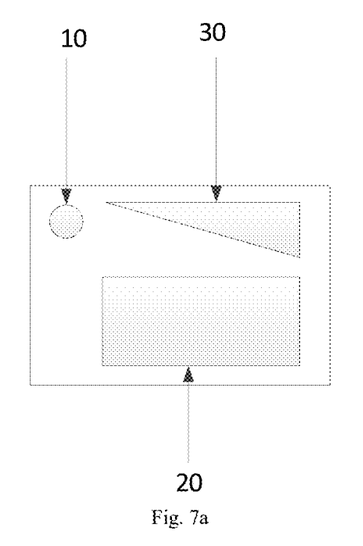
FIG. 7a is another schematic view showing the arrangement of the coupling-in grating and the coupling-out grating according to one embodiment of the present disclosure.

As shown in FIG. 7a, illustratively, the optical waveguide structure further includes an intermediate grating 30 arranged on the first surface or the second surface, and an orthogonal projection of the intermediate grating 30 onto the first surface is located between the orthogonal projection 105 of the coupling-in grating 10 onto the first surface and the orthogonal projection 106 of the coupling-out grating 20 onto the first surface. The beam splitting structure 100 includes a first beam splitting sub-structure 100 and a second beam splitting sub-structure 100. The first beam splitting sub-structure 100 is configured to allow a third part of light beams in the light beams propagated in a corresponding optical waveguide 1 to be reflected in such a manner that the third part of light beams is propagated toward the intermediate grating 30 at a third propagation step, and allow a fourth part of light beams in the light beams propagated in a corresponding optical waveguide 1 to be transmitted in such a manner that the fourth part of light beams is propagated toward the intermediate grating 30 at the first propagation step. The second sub-splitting structure 100 is configured to allow a fifth part of light beams in the light beams propagated in a corresponding optical waveguide 1 to be reflected in such a manner that the fifth part of light beams is propagated toward the coupling-out grating 20 at a fourth propagation step, and allow a sixth part of light beams in the light beams propagated in a corresponding optical waveguide 1 to be transmitted in such a manner that the sixth part of light beams is propagated toward the coupling-out grating 20 at a fifth propagation step. The third propagation step is different from the first propagation step, the fourth propagation step is different from the first propagation step, the third propagation step is different from the fourth propagation step, and the fifth propagation step is the same as, or different from, the first propagation step.

Through the arrangement of the intermediate grating 30, it is able to improve the luminous efficiency. Through the arrangement of the beam splitting structure 100 between the intermediate grating 30 and the coupling-out grating 20, it is able to prevent the uniformity of the coupled image from being adversely affected due to a difference in the propagation steps of the light beams in different fields of view.

It should be appreciated that, in some embodiments of the present disclosure, the propagation step of the light beam is not adversely affected by the intermediate grating 30, and at this time, the fifth propagation is equal to the first propagation step. In some embodiments of the present disclosure, the propagation step of the light beam is changed through the arrangement of the intermediate grating 30, and at this time, the fifth propagation step is different from the first propagation step.

Figure 7B:
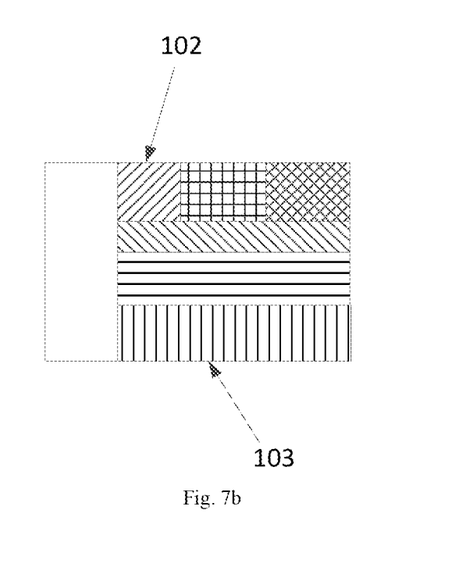

Illustratively, the beam splitting structure 100 includes at least two first light splitting members 102 arranged sequentially in a propagation direction of the light beams toward the intermediate grating 30, and at least two second light splitting members 103 arranged sequentially in a propagation direction of the light beams toward the coupling-out grating 20, ratios of intensity of the third part of light beams to intensity of the fourth part of light beams are different for the at least two first beam splitting members 102, and ratios of intensity of the fifth part of light beams to intensity of the sixth part of light beams are different for the at least two second beam splitting members 103 (as shown in FIG. 7b, the at least two first light splitting members 102 are filled with different patterns to indicate different ratios).

Through the arrangement of the at least two first light splitting members and the at least two second light splitting members, it is able to adjust the intensity of the light beams while ensuring the image uniformity, thereby to improve the luminous efficiency.

Figure 7C:
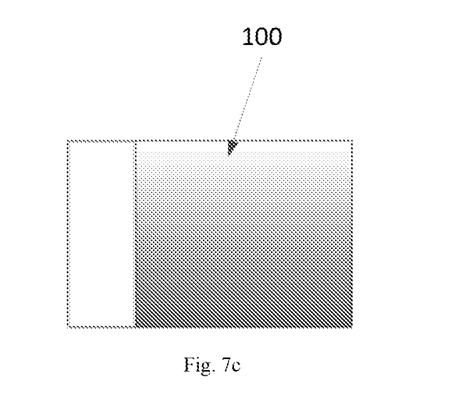

Illustratively, the beam splitting structure 100 includes at least two third light splitting members arranged in a propagation direction of the light beams from the intermediate grating 30 to the coupling-out grating 20, and for the at least two third light splitting members, ratios of intensity of the reflected light beams to intensity of the transmitted light beams gradually increase or gradually decrease in the propagation direction of the light beams from the intermediate grating 30 to the coupling-out grating 20, as shown in FIG. 7c.

Through the at least two third light splitting members, the ratios of the intensity of the reflected light beams to the intensity of the transmitted light beams gradually increase or gradually decrease, so it is able to improve the image uniformity in a better manner.

Figure 9:
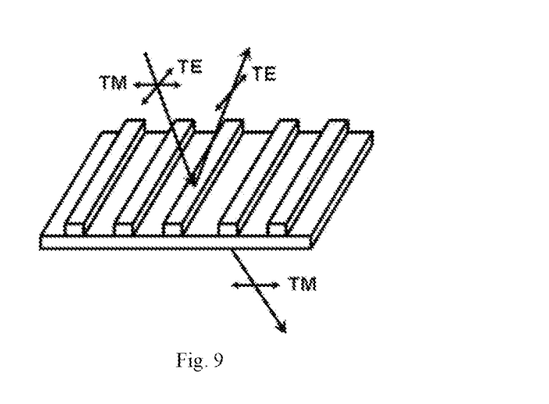
FIG. 9 is a schematic view showing an optical path of polarized light for wire grids according to one embodiment of the present disclosure.

The beam splitting structure 100 may be provided in various forms. As shown in FIG. 9, illustratively, the beam splitting structure 100 is a polarization beam splitter consisting of metal wire grids, e.g., wire grids made of a metal (Al, Ag or Au) having a period of dozens to hundreds of nanometers and having a thickness of dozens to hundreds of nanometers, so as to allow one kind of polarized light to be reflected and allow another kind of polarized light to be transmitted therethrough. At this time, the coupling-out grating 20 is arranged outside the first surface or the second surface, or arranged on a surface of the optical waveguide 1 in which the reflected polarized light is propagated initially, so as to reduce the propagation step of the light beam.

It should be appreciated that, through adjusting parameters of the metal wire grids, e.g., a period, a height and a line width, it is able to adjust a polarization splitting ratio of the metal wire grids, thereby to achieve different adjustment effects.

Illustratively, the beam splitting structure 100 includes a plurality of dielectric or metallic film layers having different refractive indices. At this time, the beam splitting structure 100 may allow a part of the light beams to be reflected and allow a part of the light beams to be transmitted therethrough selectively on the basis of field angles. In addition, the beam splitting structure 100 may allow the light beams at front viewing angles within a certain range to be transmitted at high transmissivity, and allow the light beams having a large viewing angle and totally reflected in the optical waveguide 1 to be partially reflected and partially transmitted.

It should be appreciated that, the film layers may have a same thickness or different thicknesses. Through adjusting the thicknesses of at least a part of the film layers, it is able to allow the light beams to be partially reflected and partially transmitted.

It should be appreciated that, the at least two layers of optical waveguides have a same thickness or different thicknesses. The beam splitting structure is arranged between the two adjacent layers of optical waveguides, and the light beams reflected by the beam splitting structure are transmitted in a part of the optical waveguides (the light beams transmitted through the beam splitting structure are still propagated in all the optical waveguides, so their propagation steps remain unchanged), so as to reduce the propagation step of the reflected light beam, thereby to improve the uniformity of the light beams. The propagation step of the light beam propagated in the optical waveguide is influenced by the thickness of the optical waveguide, so when the light beams reflected by the beam splitting structure are propagated in the optical waveguides having different thicknesses, it is able to obtain different propagation steps. Hence, the thickness of the corresponding optical waveguide (the optical waveguide at a light-entering side of the beam splitting structure) is adjusted so as to adjust the uniformity of the light beams. When there are more than two layers of optical waveguides, the uniformity of the light beams may be adjusted through adjusting a position of the beam splitting structure (i.e., adjusting the quantity of optical waveguides at the light-entering side of the beam splitting structure). When at least one layer of optical waveguide at the light-entering side of the beam splitting structure has a thickness different from at least one layer of optical waveguide at a light-exiting side of the beam splitting structure, the propagation step of the light beam reflected by the beam splitting structure may also be adjusted through changing the position of the coupling-in grating.

It should be further appreciated that, when the beam splitting structure is a polarization beam splitter, the light beam reflected by the beam splitting structure is merely propagated in the optical waveguide at the light-entering side of the beam splitting structure. In other words, the propagation step of the light beam is merely changed once. When the beam splitting structure includes a plurality of dielectric or metallic film layers having different refractive indices and the light beams are split by the beam splitting structure for the first time, the propagation step of the reflected light beam is changed but the propagation step of the transmitted light beam remains unchanged. When the transmitted light beam is totally reflected by the light-exiting surface of the top-layer optical waveguide to the beam splitting structure, it is split for the second time. At this time, the propagation step of the reflected light beam is changed, and the propagation step of the transmitted light beam remains unchanged.

The present disclosure further provides in some embodiments a display device which includes the above-mentioned optical waveguide structure.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. An optical waveguide structure, comprising:
   at least two layers of optical waveguides laminated one on another and having a same refractive index, the optical waveguides comprising a bottom-layer optical waveguide and a top-layer optical waveguide in a lamination direction, the bottom-layer optical waveguide comprising a first surface away from the top-layer optical waveguide, and the top-layer optical waveguide comprising a second surface away from the bottom-layer optical waveguide;
   a coupling-in grating provided on the first surface or the second surface and configured to allow received parallel light beams to enter the optical waveguides, and the parallel light beams being propagated in the optical waveguides in a total-reflection manner at a first propagation step;
   a beam splitting structure arranged between two adjacent layers of the optical waveguides, and configured to allow a first part of light beams in the light beams propagated in a corresponding optical waveguide to be reflected in such a manner that the first part of light beams are propagated at a second propagation step, and allow a second part of light beams in the light beams propagated in a corresponding optical waveguide to be transmitted in such a manner that the second part of light beams are propagated at the first propagation step, the second propagation step being different from the first propagation step; and
   a coupling-out grating arranged on the first surface or the second surface and configured to extract the light beams propagated in total-reflection manner in the at least two layers of optical waveguides;
   wherein the beam splitting structure comprises at least two light splitting members arranged sequentially in a propagation direction of the light beams within the optical waveguides, and for the at least two light splitting members, ratios of intensity of the first part of light beams to intensity of the second part of light beams are different; and
   for the at least two light splitting members, the ratios of the intensity of the first part of light beams to the intensity of the second part of light beams gradually increase or gradually decrease in the propagation direction of the light beams within the optical waveguides;

wherein change in splitting ratios of the at least two light splitting members is set in accordance with the space arrangement of the coupling-in grating and the coupling-out grating;

wherein an orthogonal projection of the beam splitting structure onto the first surface is located within a first region of the first surface such that light beams from the beam splitting structure are directly transmitted toward the coupling-out grating, there is a gap between the first region and an orthogonal projection of the coupling-in grating onto the first surface and the first region is arranged to partially overlap an orthogonal projection of the coupling-out grating onto the first surface.

2. The optical waveguide structure according to claim 1, wherein a width of the beam splitting structure in a propagation direction of the light beam in the optical waveguides is larger than a width of the light beam in the optical waveguides.

3. The optical waveguide structure according to claim 1, further comprising an intermediate grating arranged on the first surface or the second surface, wherein an orthogonal projection of the intermediate grating onto the first surface is located between an orthogonal projection of the coupling-in grating onto the first surface and an orthogonal projection of the coupling-out grating onto the first surface;

wherein the beam splitting structure comprises a first beam splitting sub-structure and a second beam splitting sub-structure, the first beam splitting sub-structure is configured to allow a third part of light beams in the light beams propagated in a corresponding optical waveguide to be reflected in such a manner that the third part of light beams is propagated toward the intermediate grating at a third propagation step, and allow a fourth part of light beams in the light beams propagated in a corresponding optical waveguide to be transmitted in such a manner that the fourth part of light beams is propagated toward the intermediate grating at the first propagation step, the second sub-splitting structure is configured to allow a fifth part of light beams in the light beams propagated in a corresponding optical waveguide to be reflected in such a manner that the fifth part of light beams is propagated toward the coupling-out grating at a fourth propagation step, and allow a sixth part of light beams in the light beams propagated in a corresponding optical waveguide to be transmitted in such a manner that the sixth part of light beams is propagated toward the coupling-out grating at a fifth propagation step, the third propagation step is different from the first propagation step, the fourth propagation step is different from the first propagation step, the third propagation step is different from the fourth propagation step, and the fifth propagation step is the same as, or different from, the first propagation step.

4. The optical waveguide structure according to claim 3, wherein the beam splitting structure comprises at least two first light splitting members arranged sequentially in a propagation direction of the light beams toward the intermediate grating, and at least two second light splitting members arranged sequentially in a propagation direction of the light beams toward the coupling-out grating, ratios of intensity of the third part of light beams to intensity of the fourth part of light beams are different for the at least two first beam splitting members, and ratios of intensity of the fifth part of light beams to intensity of the sixth part of light beams are different for the at least two second beam splitting members.

5. The optical waveguide structure according to claim 3, wherein the beam splitting structure comprises at least two third light splitting members arranged in a propagation direction of the light beams from the intermediate grating to the coupling-out grating, and for the at least two third light splitting members, ratios of intensity of the reflected light beams to intensity of the transmitted light beams gradually increase or gradually decrease in the propagation direction of the light beams from the intermediate grating to the coupling-out grating.

6. The optical waveguide structure according to claim 1, wherein the beam splitting structure is a polarization beam splitter consisting of metal wire grids.

7. The optical waveguide structure according to claim 1, wherein the beam splitting structure comprises a plurality of dielectric or metallic film layers having different refractive indices.

8. A display device, comprising the optical waveguide structure according to claim 1.

9. The display device according to claim 8, wherein a width of the beam splitting structure in a propagation direction of the light beam in the optical waveguides is larger than a width of the light beam in the optical waveguides.

10. The display device according to claim 8, wherein the optical waveguide structure further comprises an intermediate grating arranged on the first surface or the second surface, and an orthogonal projection of the intermediate grating onto the first surface is located between an orthogonal projection of the coupling-in grating onto the first surface and an orthogonal projection of the coupling-out grating onto the first surface;

wherein the beam splitting structure comprises a first beam splitting sub-structure and a second beam splitting sub-structure, the first beam splitting sub-structure is configured to allow a third part of light beams in the light beams propagated in a corresponding optical waveguide to be reflected in such a manner that the third part of light beams is propagated toward the intermediate grating at a third propagation step, and allow a fourth part of light beams in the light beams propagated in a corresponding optical waveguide to be transmitted in such a manner that the fourth part of light beams is propagated toward the intermediate grating at the first propagation step, the second sub-splitting structure is configured to allow a fifth part of light beams in the light beams propagated in a corresponding optical waveguide to be reflected in such a manner that the fifth part of light beams is propagated toward the coupling-out grating at a fourth propagation step, and allow a sixth part of light beams in the light beams propagated in a corresponding optical waveguide to be transmitted in such a manner that the sixth part of light beams is propagated toward the coupling-out grating at a fifth propagation step, the third propagation step is different from the first propagation step, the fourth propagation step is different from the first propagation step, the third propagation step is different from the fourth propagation step, and the fifth propagation step is the same as, or different from, the first propagation step.

11. The display device according to claim 10, wherein the beam splitting structure comprises at least two first light splitting members arranged sequentially in a propagation direction of the light beams toward the intermediate grating, and at least two second light splitting members arranged sequentially in a propagation direction of the light beams toward the coupling-out grating, ratios of intensity of the third part of light beams to intensity of the fourth part of light beams are different for the at least two first beam splitting members, and ratios of intensity of the fifth part of light beams to intensity of the sixth part of light beams are different for the at least two second beam splitting members.

12. The display device according to claim 10, wherein the beam splitting structure comprises at least two third light splitting members arranged in a propagation direction of the light beams from the intermediate grating to the coupling-out grating, and for the at least two third light splitting members, ratios of intensity of the reflected light beams to intensity of the transmitted light beams gradually increase or gradually decrease in the propagation direction of the light beams from the intermediate grating to the coupling-out grating.

13. The display device according to claim 8, wherein the beam splitting structure is a polarization beam splitter consisting of metal wire grids.

14. The display device according to claim 8, wherein the beam splitting structure comprises a plurality of dielectric or metallic film layers having different refractive indices.

* * * * *